(12) United States Patent
Hayase et al.

(10) Patent No.: US 11,892,055 B2
(45) Date of Patent: Feb. 6, 2024

(54) SHOCK ABSORBER

(71) Applicant: KYB Corporation, Tokyo (JP)

(72) Inventors: Tomomi Hayase, Tokyo (JP); Tetsuo Arahata, Tokyo (JP); Seiji Iwahara, Tokyo (JP); Kouhei Tomita, Tokyo (JP)

(73) Assignee: KYB CORPORATION, Tokyo (JP)

( * ) Notice: Subject to any disclaimer, the term of this patent is extended or adjusted under 35 U.S.C. 154(b) by 443 days.

(21) Appl. No.: 17/277,494

(22) PCT Filed: Aug. 1, 2019

(86) PCT No.: PCT/JP2019/030248
§ 371 (c)(1),
(2) Date: Mar. 18, 2021

(87) PCT Pub. No.: WO2020/075372
PCT Pub. Date: Apr. 16, 2020

(65) Prior Publication Data
US 2021/0317892 A1      Oct. 14, 2021

(30) Foreign Application Priority Data
Oct. 9, 2018   (JP) ................................. 2018-190871

(51) Int. Cl.
*F16F 9/36*      (2006.01)
*F16F 9/18*      (2006.01)
(Continued)

(52) U.S. Cl.
CPC ............. *F16F 9/369* (2013.01); *F16F 9/185* (2013.01); *F16F 9/062* (2013.01); *F16F 9/064* (2013.01);
(Continued)

(58) Field of Classification Search
CPC .. F16F 9/369; F16F 9/185; F16F 9/062; F16F 9/064; F16F 9/3235; F16F 2222/12;
(Continued)

(56) References Cited

U.S. PATENT DOCUMENTS 5,960,915 A * 10/1999 Nezu ....................... F16F 9/465
                                                      188/266.6
6,283,259 B1 * 9/2001 Nakadate ................ F16F 9/369
                                                      188/299.1
(Continued)

FOREIGN PATENT DOCUMENTS

JP      2013-015163 A      1/2013
JP      6017681 B2         11/2016

OTHER PUBLICATIONS

International Search Report for PCT/JP2019/030248, dated Oct. 21, 2019 (3 pgs. with English translation).
(Continued)

*Primary Examiner* — Thomas W Irvin
(74) *Attorney, Agent, or Firm* — Smith, Gambrell & Russell, LLP

(57) ABSTRACT

Provided is a shock absorber capable of improving the dimensional quality and ensuring the sealing performance of a seal ring. The shock absorber includes a cylinder, an outer tube, an intermediate tube, and a discharge passage defined between the intermediate tube and the cylinder, a reservoir defined between the intermediate tube and the outer tube. The intermediate tube includes, on its inner circumferential surface, a groove having a concave shape in cross section to be capable of accommodating a seal ring that closes the discharge passage. A relationship of θ1<θ2 is satisfied, where θ1 represents an angle formed between one side surface, out of both side surfaces of the groove of the intermediate tube, that is located on an axial end side of the intermediate tube, and a plane orthogonal to an axial direc-
(Continued)

tion of the intermediate tube, and θ2 represents an angle formed between the other side surface that is located on an axial center side of the intermediate tube and the plane.

1 Claim, 5 Drawing Sheets

(51) Int. Cl.
*F16F 9/06* (2006.01)
*F16F 9/32* (2006.01)
(52) U.S. Cl.
CPC ......... *F16F 9/3235* (2013.01); *F16F 2222/12* (2013.01); *F16F 2226/04* (2013.01); *F16F 2230/30* (2013.01); *F16F 2232/08* (2013.01); *F16F 2234/02* (2013.01)
(58) Field of Classification Search
CPC ........... F16F 2222/2226; F16F 2222/04; F16F 2230/30; F16F 2232/08; F16F 2234/02
USPC .............................................. 188/315, 322.2
See application file for complete search history.

(56) References Cited

U.S. PATENT DOCUMENTS

| | | | |
|---|---|---|---|
| 8,469,162 B2* | 6/2013 | Nishimura | F16F 9/325 |
| | | | 188/266.2 |
| 9,046,145 B2* | 6/2015 | Murakami | F16F 9/464 |
| 9,169,888 B2* | 10/2015 | Nishimura | F16F 9/3235 |
| 9,285,006 B2* | 3/2016 | Katayama | F16F 9/3257 |
| 9,707,820 B2* | 7/2017 | Yamashita | B21H 7/182 |
| 10,012,282 B2* | 7/2018 | Kimura | F16F 9/46 |
| 10,352,390 B2* | 7/2019 | Hase | F16F 9/18 |
| 2003/0155198 A1* | 8/2003 | Muller | F16F 9/3235 |
| | | | 188/322.19 |
| 2014/0090938 A1* | 4/2014 | Nishimura | F16F 9/369 |
| | | | 188/269 |
| 2016/0052361 A1* | 2/2016 | Yamashita | F16F 9/3235 |
| | | | 188/266.1 |

OTHER PUBLICATIONS

Written Opinion of the International Searching Authority for PCT/JP2019/030248, dated Oct. 21, 2019 (4 pgs.).

* cited by examiner

SHOCK ABSORBER

TECHNICAL FIELD

The present invention relates to shock absorbers.

BACKGROUND ART

A conventional shock absorber is disclosed in Patent Literature 1. This is a multiple-cylinder type hydraulic shock absorber for adjusting a damping force using a solenoid, and includes a cylinder, an intermediate tube (separator tube) that covers the outer circumference of the cylinder and defines a discharge passage (a annular passage) between the intermediate tube and the cylinder, and an outer tube that covers the outer circumference of the intermediate tube and defines a reservoir between the outer tube and the intermediate tube. A damping valve for adjusting the damping force is provided between the discharge passage and the reservoir.

The intermediate tube includes seal ring grooves on the inner circumferential surfaces of both ends thereof having reduced diameters. The seal ring grooves respectively have concave shapes in cross section and are capable of accommodating seal rings that close the discharge passage. Of both side surfaces of each seal ring groove of the intermediate tube, a side surface located on an axial end side of the intermediate tube is set to have a larger inclination angle with respect to a plane orthogonal to an axial direction of the intermediate tube than that of a side surface located on an axial center side.

The seal ring groove is formed with a bead that bulges outward, by, for example, rotating a cantilever type tool inside the intermediate tube, and plastically deforming a material of the intermediate tube so as to push out the material in the radial direction by a convex portion provided at a tip portion of the cantilever type tool.

CITATIONS LIST

Patent Literature

Patent Literature 1: JP 6017681 B2

SUMMARY OF INVENTION

Technical Problems

In the above case, the inclination angle of the side surface located on the axial end side of the intermediate tube is large. Hence, there is a concern that when the seal ring in the seal ring groove is pushed to the axial end side (a low-pressure side) by the hydraulic pressure of the discharge passage, a part of the seal ring may protrude from the axial end side and may be damaged. The damage may impair the sealing performance.

On the other hand, there is a circumstance that the cantilever type tool may be warped due to a processing reaction force from the intermediate tube. There is a concern that the warp of the cantilever type tool may cause variations in processing accuracy, and may lead, to unstable dimensional quality of the seal ring groove. In particular, there is a circumstance that in a case where the inclination angle of the side surface of the seal ring groove is small, the processing reaction force becomes large and the cantilever type tool may be easily warped.

The present invention has been made in view of the above conventional circumstances, and has an object, as a solution to problem, to provide a shock absorber capable of improving the dimensional quality and ensuring the sealing performance of a seal ring.

Solutions to Problems

A shock absorber according to the present invention includes: a cylinder; a piston rod movably inserted into the cylinder; a piston connected with the piston rod; an outer tube covering an outer circumference of the cylinder; and an intermediate tube disposed between the cylinder and the outer tube and covering the outer circumference of the cylinder. The piston partitions an inside of the cylinder into a first chamber on which the piston rod is located and a second chamber on an opposite side thereof. A reservoir having an annular shape is formed between the cylinder and the outer tube. The intermediate tube is disposed at an inner side of the reservoir.

In addition, the shock absorber includes a suction passage that allows only a flow of a liquid from the reservoir to the second chamber; a rectifying passage that allows only the flow of the liquid from the second chamber to the first chamber; and a damping valve that imparts resistance to the flow of the liquid from the inside of the cylinder to the reservoir. A discharge passage communicating with the inside of the cylinder is formed among the intermediate tube, the cylinder, and the damping valve. The intermediate tube includes, on an inner circumferential surface thereof, a groove having a concave shape in cross section to be capable of accommodating a seal ring that closes the discharge passage. A relationship of $\theta 1 < \theta 2$ is set to be satisfied, where $\theta 1$ represents an angle formed between one side surface, out of both side surfaces of the groove of the intermediate tube, that is located on an axial end side of the intermediate tube, and a plane orthogonal to an axial direction of the intermediate tube, and $\theta 2$ represents an angle formed between the other side surface that is located on an axial center side of the intermediate tube and the plane.

DESCRIPTION OF EMBODIMENTS

First Embodiment

Figure 1:
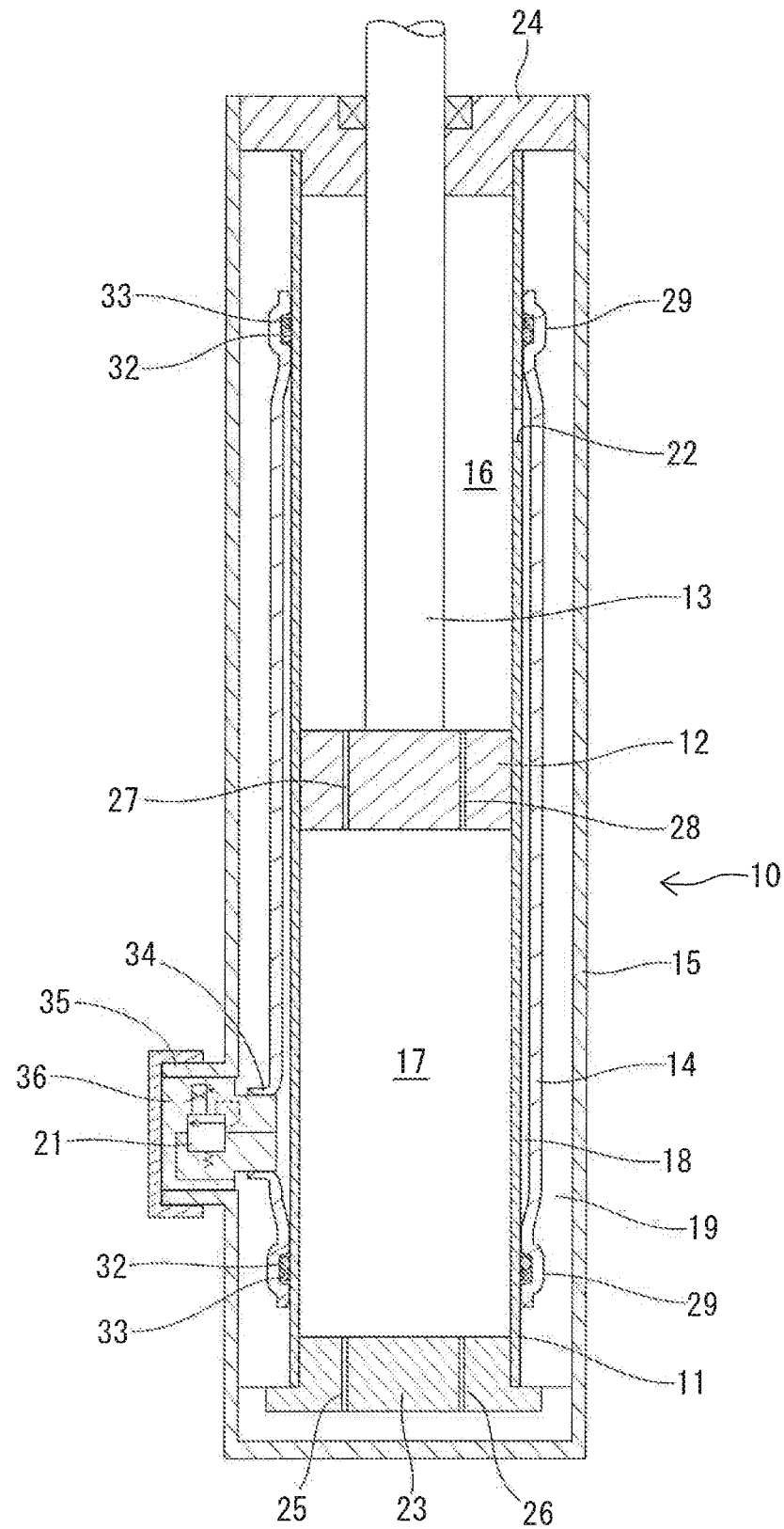
FIG. 1 is a cross-sectional view of a shock absorber in a first embodiment.

A first embodiment will be described with reference to FIGS. 1 to 4. As shown in FIG. 1, a shock absorber 10 in the first embodiment includes a cylinder 11 which has a substantially cylindrical shape, a piston 12 which has a substantially columnar shape and is inserted into the cylinder 11 to be reciprocally slidable, a piston rod 13 which has a substantially columnar rod shape and is connected with the piston 12, an intermediate tube 14 which has a substantially cylindrical shape and covers the outer circumference of the cylinder 11, and an outer tube 15 which has a substantially cylindrical shape and covers the outer circumference of the intermediate tube 14. The inside of the cylinder 11 is divided into a first chamber 16 which is a side where the piston rod 13 is located, and a second chamber 17 which is an opposite side, with the piston 12 being interposed therebetween.

The shock absorber 10 includes a discharge passage 18 having an annular shape in cross section in the radial direction between the cylinder 11 and the intermediate tube 14, a reservoir 19 having an annular shape in cross section in the radial direction between the intermediate tube 14 and the outer tube 15, and a damping valve 21 which communicates the discharge passage 18 and the reservoir 19. The discharge passage 18 communicates with the first chamber 16 through a through hole 22 provided in the cylinder 11.

A hydraulic oil, which is a liquid as a hydraulic fluid, is filled in the first chamber 16, the second chamber 17, and the reservoir 19 in the cylinder 11. The reservoir 19 is enclosed with a gas, in addition to the hydraulic oil.

The shock absorber 10 includes a base valve 23 which is mounted on one end (a lower end in the drawing) of the cylinder 11, and a rod guide 24 which is mounted on the other end (an upper end in the drawing) of the cylinder 11 and the other end of the outer tube 15. The base valve 23 includes a suction passage 25 which allows only the hydraulic oil to flow from the reservoir 19 side to the second chamber 17 side, and an oil passage 26 which relieves the hydraulic oil of the second chamber 17 side to the reservoir 19 side when the pressure of the hydraulic oil of the second chamber 17 side reaches a certain pressure.

The piston 12 includes a rectifying passage 27 which allows only the flow of the hydraulic oil from the second chamber 17 side to the first chamber 16 side, and an oil passage 28 which relieves the hydraulic oil of the first chamber 16 side to the second chamber 17 side when the pressure of the hydraulic oil of the first chamber 16 side reaches a certain pressure.

The piston rod 13 extends from one end thereof fixed to the piston 12 so as to pass through the first chamber 16, slidably penetrates through the rod guide 24, and is exposed to the outside of the cylinder 11.

Figure 2:
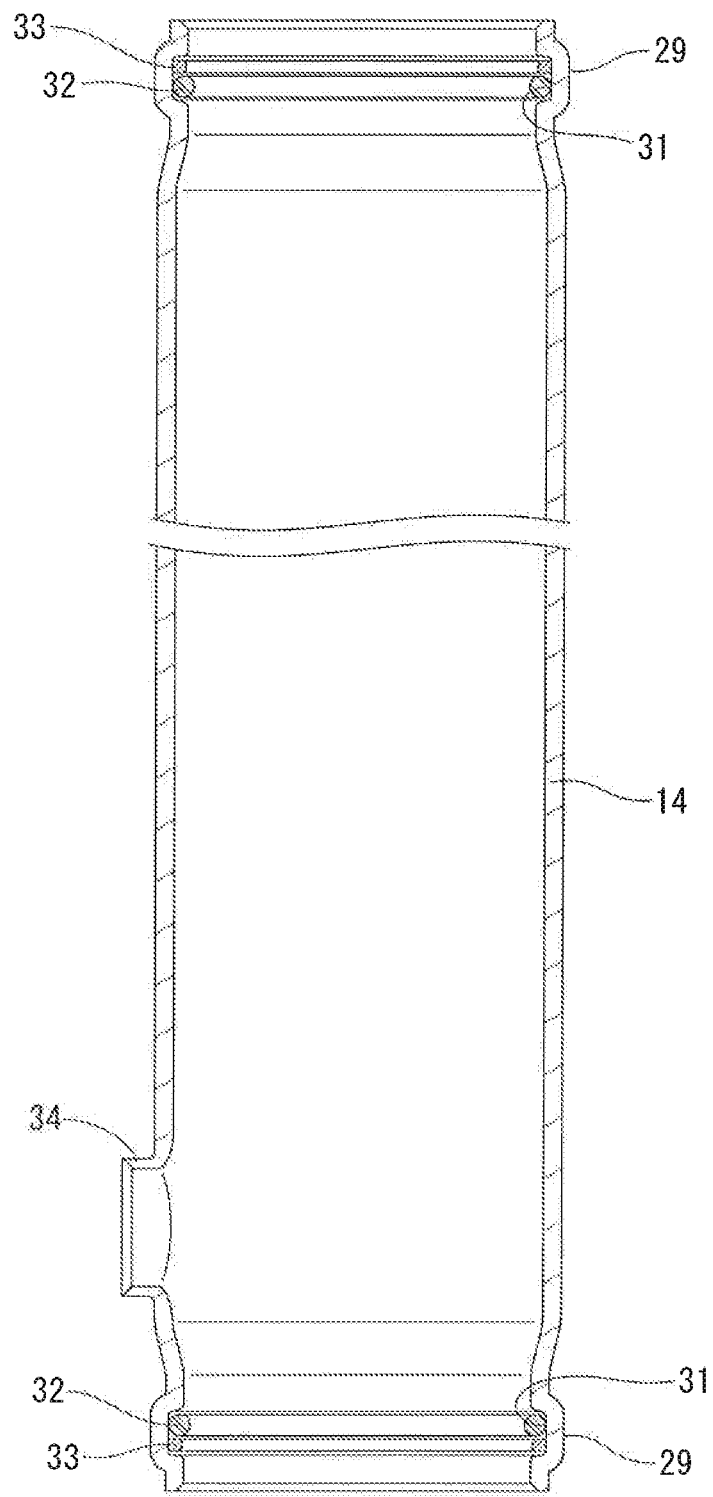
FIG. 2 is a cross-sectional view of an intermediate tube in which a seal ring and a back-up ring are mounted in a groove.

As shown in FIG. 2, both end portions (both end portions in the axial direction) of the intermediate tube 14 are reduced in diameter by swaging processing or the like. The intermediate tube 14 includes beads 29 which respectively bulge outward at both end portions, and grooves 31 which respectively extend over the entire circumferences on inner circumferential surfaces of the beads 29. The grooves 31 of the intermediate tube 14 are each capable of accommodating a seal ring 32 and a back-up ring 33 in parallel to each other in the axial direction. The seal ring 32 is in close contact with the outer circumferential surface of the cylinder 11 while being mounted in the groove 31 of the intermediate tube 14. The discharge passage 18 is defined by being closed with the seal rings 32 at both ends in the axial direction.

The intermediate tube 14 includes a fitting portion 34 which is provided in a part closer to the base valve 23 and has a burring (extruded hole) shape projecting outward (the left side in FIG. 2). The outer tube 15 includes a guide portion 35 which is provided at a position facing the fitting portion 34 and is larger by one size than the fitting portion 34.

A unit 36 including the damping valve 21 is fixed in the guide portion 35. A solenoid part of the unit 36 is fitted in the fitting portion 34, controls the flow of the hydraulic oil flowing from the discharge passage 18 through the fitting portion 34 to the reservoir 19, and generates a damping force.

When the shock absorber 10 contracts, the piston 12 moves to the lower side in the drawing, the second chamber 17 is compressed, and the hydraulic oil in the second chamber 17 moves to the first chamber 16 side through the rectifying passage 27 of the piston 12. At the time of contraction, the piston rod 13 enters the cylinder 11, and the hydraulic oil corresponding to the entering volume of the piston rod 13 is pushed out of the cylinder 11, flows into the discharge passage 18, and is further discharged from the discharge passage 18 through the damping valve 21 to the reservoir 19. The damping valve 21 imparts resistance to the flow of the hydraulic oil from the discharge passage 18 to the reservoir 19, and raises the pressures in the cylinder 11 and the discharge passage 18. Consequently, the shock absorber 10 generates a compression-side damping force.

On the other hand, when the shock absorber 10 extends, the piston 12 moves to the upper side in the drawing, the first chamber 16 is compressed, and the hydraulic oil in the first chamber 16 flows into the discharge passage 18, and is further discharged from the discharge passage 18 through the damping valve 21 to the reservoir 19. The damping valve 21 imparts resistance to the flow of the hydraulic oil from the discharge passage 18 to the reservoir 19, and raises the pressures in the first chamber 16 and the discharge passage 18. At the time of extension, the volume of the second chamber 17 expands, and the hydraulic oil corresponding to the expansion volume is supplied from the reservoir 19 through the suction passage 25 of the base valve 23. Consequently, the shock absorber 10 generates an extension-side damping force.

As described above, when the shock absorber 10 extends and contracts, the hydraulic oil is discharged from the cylinder 11 to the reservoir 19 through the discharge passage 18. The seal ring 32 is arranged in the groove 31 of the intermediate tube 14 on a side facing the discharge passage 18 (a high-pressure side P2), which is the axial center side of the intermediate tube 14, and directly receives the oil pressure from the discharge passage 18 toward an axial end side of the intermediate tube 14 (a low-pressure side P1, an open end side). The back-up ring 33 is arranged to be adjacent to the seal ring 32 in the groove 31 of the intermediate tube 14 on a side apart from the discharge passage 18, which is the axial end side of the intermediate tube 14. The back-up ring 33 prevents the seal ring 32 having received the pressure from the discharge passage 18, from being deformed to the low-pressure side P1.

Figure 3:
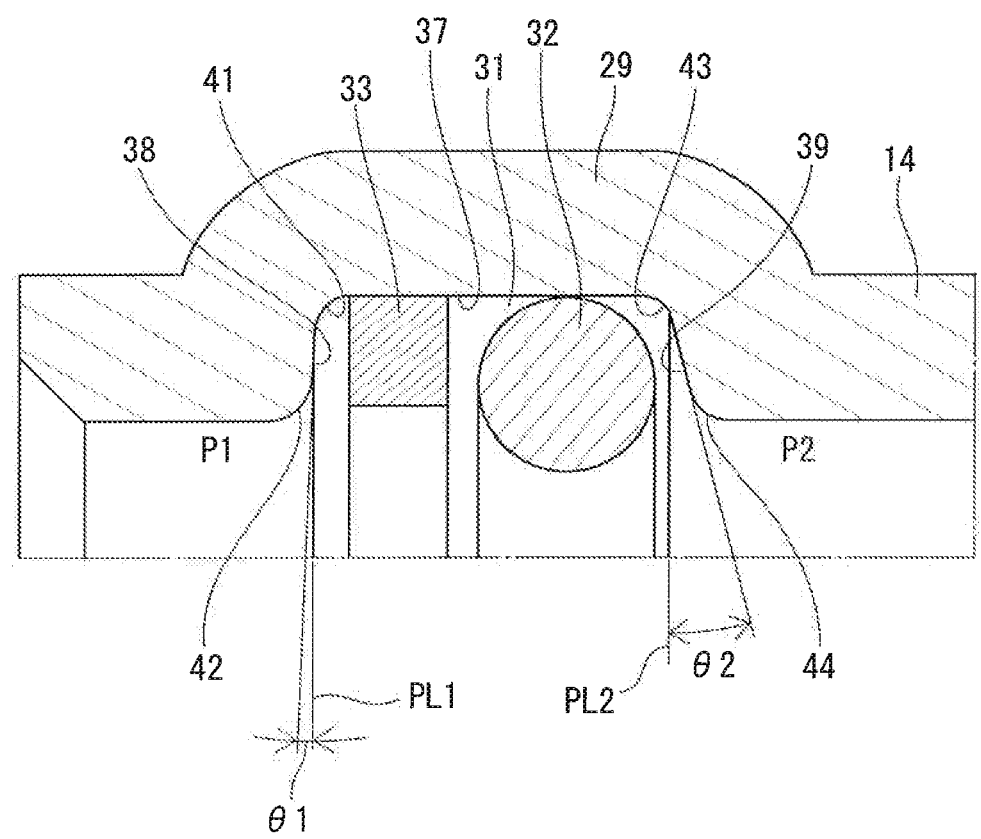
FIG. 3 is an enlarged cross-sectional view showing a state in which the seal ring and the back-up ring are mounted in the groove, in the intermediate tube.

The seal ring 32 is an O-ring made of rubber, and has an inner diameter smaller than an outer diameter of the outer circumferential surface of the cylinder 11, in a natural state. The back-up ring 33 is made of a synthetic resin, has rigidity higher than that of the seal ring 32, and has a ring shape corresponding to the seal ring 32. As shown in FIG. 3, the seal ring 32 is circular in the axial cross section, and, the back-up ring 33 is rectangular in the axial cross section.

As shown in FIG. 3, the groove 31 of the intermediate tube 14 has a substantially angular concave shape in the axial cross section. The groove 31 includes a back surface 37 arranged along the axial direction, and a first side surface 38 and a second side surface 39 which are arranged to face each other on both sides in the axial direction with the seal ring 32 and the back-up ring 33 being sandwiched therebetween.

The back surface 37 is a horizontal plane (a plane along the axial direction) extending in the axial direction with a predetermined length. The axial length of the back surface 37 corresponds to the groove width of the groove 31, and is configured to be slightly larger than a value obtained by adding the axial dimensions of the seal ring 32 and the back-up ring 33.

The first side surface 38 is a side surface having a straight shape (a straight line shape in the axial cross section) located on the axial end side (the low-pressure side P1) of the intermediate tube 14. The first side surface 38 faces the back-up ring 33, and is arranged to be abuttable with the back-up ring 33. The radial outer end of the first side surface 38 and the back surface 37 are connected with each other by a first outer curved surface 41 having a curved shape (a curved line shape in the axial cross section). The radial inner end of the first side surface 38 and an axial end side part of the inner circumferential surface of the intermediate tube 14 are connected with each other by a first inner curved surface 42 having a curved shape (a curved line shape in the axial cross section).

The first side surface 38 is arranged in an inclined manner to be gradually displaced toward the axial end side (the low-pressure side P1) from the first outer curved surface 41 side to the first inner curved surface 42 side with respect to a plane PL1 which is along a direction orthogonal to the axial direction of the intermediate tube 14. An angle θ1 of the first side surface 38 with respect to the plane PL1 is set to be larger than 0 degrees and smaller than 5 degrees.

The second side surface 39 is a side surface having a straight shape (a straight line shape in the axial cross section) located on the axial center side (the high-pressure side P2) of the intermediate tube 14 with respect to the first side surface 38. The second side surface 39 faces the seal ring 32, and is arranged to be abuttable with the seal ring 32. The radial outer end of the second side surface 39 and the back surface 37 are connected with each other by a second outer curved surface 43 having a curved shape (a curved line shape in the axial cross section). The radial inner end of the second side surface 39 and an axial center side part of the inner circumferential surface of the intermediate tube 14 are connected with each other by a second inner curved surface 44 having a curved shape (a curved line shape in the axial cross section).

The second side surface 39 is arranged in an inclined manner to be gradually displaced toward the axial center side (the high-pressure side P2) from the second outer curved surface 43 side to the second inner curved surface 44 side with respect to a plane PL2 which is along a direction orthogonal to the axial direction of the intermediate tube 14. An angle θ2 of the second side surface 39 with respect to the plane PL2 is set to be larger than the angle θ1 of the first side surface 38, and to be equal to or smaller than 10 degrees.

The curvature radius of the second outer curved surface 43 is set to be smaller than the curvature radius of the first outer curved surface 41, and the curvature radius of the second inner curved surface 44 is set to be smaller than the curvature radius of the first inner curved surface 42. Therefore, the second side surface 39 in the inclination direction is longer in length than the first side surface 38 in the inclination direction.

Figure 4:
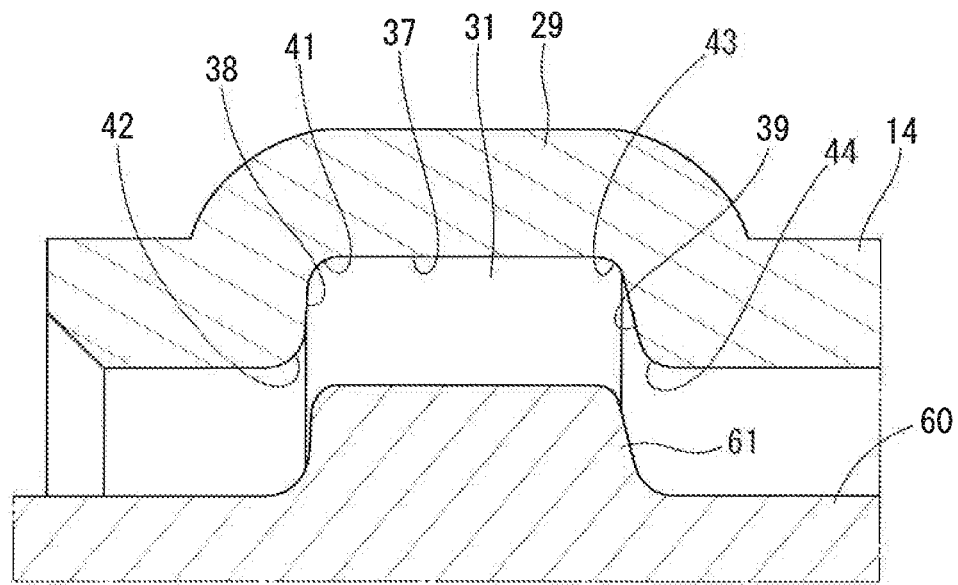
FIG. 4 is an enlarged cross-sectional view showing a state in which the groove is processed with a tool, in the intermediate tube.

The groove 31 of the intermediate tube 14 is formed by a tool 60, a part of which is shown in FIG. 4. The tool 60 is cantilevered, has a rod shape, and includes a protrusion 61 having a convex shape corresponding to the concave shape of the groove 31 at a tip portion (a free end portion) of the tool 60. The tip portion of the tool 60 is inserted into the intermediate tube 14 from the axial end side (the low-pressure side P1), and is rotated in a planetary manner along a part to be formed into the groove on the inner circumferential surface of the intermediate tube 14. Accordingly, the protrusion 61 pushes out and plastically deforms the part of the intermediate tube 14, so that the groove 31 is formed together with the bead 29.

Since the tool 60 has a cantilever shape, there is a concern that in processing the groove 31, the tip portion of the tool 60 may receive the processing reaction force from the intermediate tube 14 side, and may be warped. In this situation, if the angle θ2 of the second side surface 39 is small, the processing reaction force applied to the tip portion of the tool 60 becomes large, and accordingly, the amount of the warp of the tool 60 also becomes large, with the result that the dimensional accuracy of the groove 31 is likely to vary.

However, in the case of the first embodiment, the angle θ2 of the second side surface 39 is set to be larger than the angle θ1 of the first side surface 38 so that the processing reaction force applied to the tip portion of the tool 60 becomes smaller than usual. Therefore, the amount of the warp of the tool 60 is small, and the dimensional accuracy of the groove 31 is less likely to vary. As a result, the quality of the intermediate tube 14 can be improved.

Here, if the angle θ2 of the second side surface 39 is larger than 10 degrees, there is a concern that in an assembling process for inserting the cylinder 11 into the intermediate tube 14, a part of the seal ring 32 may be dragged by the cylinder 11 in the insertion process and may protrude from the second inner curved surface 44, so that the part may be sandwiched between the cylinder 11 and the intermediate tube 14 and deformed into a distortion. In that regard, however, in the case of the first embodiment, the angle θ2 of the second side surface 39 is equal to or smaller than 10 degrees. Thus, the seal, ring 32 is prevented from escaping toward the insertion direction of the cylinder 11, so that a state in which the seal ring 32 is properly mounted in the groove 31 can be maintained.

The first side surface 38 of the groove 31 receives and supports the back-up ring 33. The angle θ1 of the first side surface 38 is made smaller than the angle θ2 of the second side surface 39, and is set to a value substantially close to zero (0). For this reason, the back-up ring 33 is supported along the first side surface 38 without being substantially inclined. As a result, the seal ring 32 is also stably supported by the back-up ring 33 without being substantially inclined. This prevents a part of the seal ring 32 from protruding from the groove 31.

Assuming that the angle θ1 of the first side surface 38 is equal to or larger than 5 degrees, there is a concern that a part of the seal ring 32 may protrude from the groove 31, and besides, there is another concern that the back-up ring 33 may be inclined along the first side surface 38, and the seal ring 32 may abut a corner in the axial cross section of the back-up ring 33 in the inclined posture, and may be damaged. In that regard, however, in the case of the first embodiment, the angle θ1 of the first side surface 38 is smaller than 5 degrees. Therefore, it is possible to prevent the seal ring 32 from being damaged by abutting a corner in the axial cross section of the back-up ring 33. Further, in a case where the angle θ1 of the first side surface 38 is smaller than 5 degrees, the requirement of the groove wall angle specified in JIS B2401 can be satisfied.

As described heretofore, according to the first embodiment, the intermediate tube 14 includes the groove 31 which has a concave shape in cross section to be capable of accommodating the seal ring 32 which closes the discharge passage 18. A relationship of θ1<θ2 is set to be satisfied, where θ1 represents an angle formed between the plane PL1 and the first side surface 38 which is a side surface located on the axial end side (the low-pressure side P1) of the intermediate tube 14, and θ2 represents an angle formed between the plane PL2 and the second side surface 39 which is a side surface located on the axial center side (the high-pressure side P2) of the intermediate tube 14. Thus, the angle θ1 of the first side surface 38 is set to be relatively small. This configuration can prevent the seal ring 32 from protruding from the groove 31 and ensure the sealing performance of the seal ring 32. Further, the angle θ2 of the second side surface 39 is set to be relatively large, so that the warp of the tool 60 can be reduced. Consequently, the dimensional quality can be improved.

Second Embodiment

Figure 5:
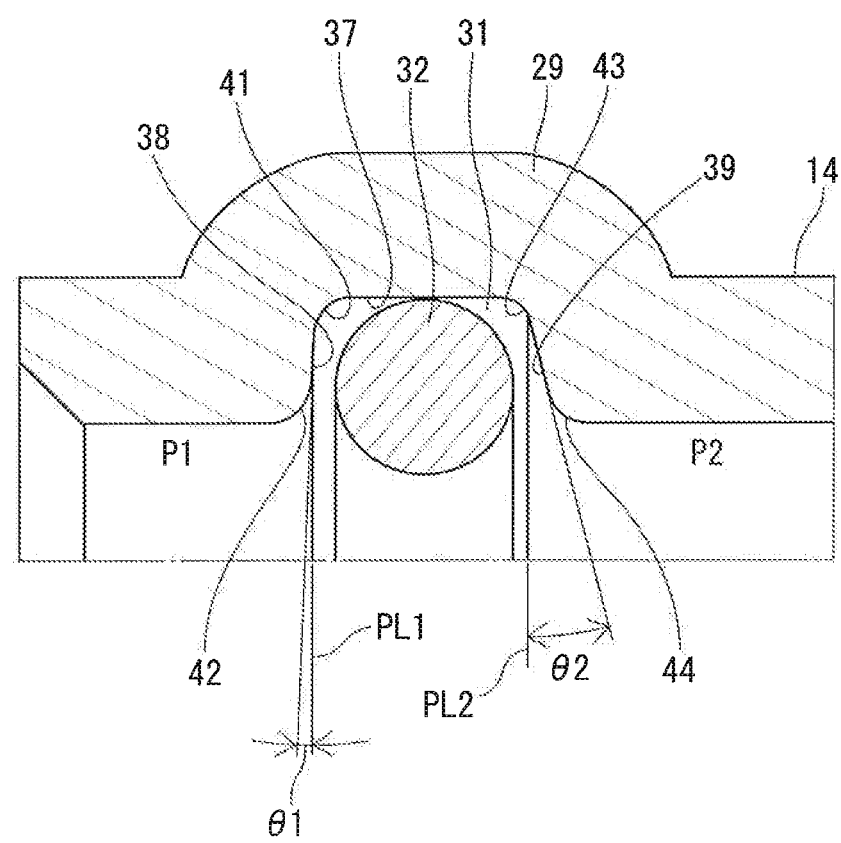
FIG. 5 is an enlarged cross-sectional view showing a state in which a seal ring is mounted in a groove in an intermediate tube in a second embodiment.

FIG. 5 is an enlarged cross-sectional view including the groove 31 of the intermediate tube 14 in a second embodiment. A shock absorber in the second embodiment does not include the back-up ring 33, and only the seal ring 32 is mounted in the groove 31 of the intermediate tube 14. It is to be noted that in the second embodiment, the same parts as or corresponding parts to those in the first embodiment are designated by the same reference signs as those in the first embodiment.

The groove 31 of the intermediate tube 14 is defined by the back surface 37, the first side surface 38, the second side surface 39, the first outer curved surface 41, the second outer curved surface 43, the first inner curved surface 42, and the second inner curved surface 44, in the same manner as in the first embodiment. The angle θ1 of the first side surface 38 with respect to the plane PL1 is smaller than the angle θ2 of the second side surface 39. This point is also the same as in the first embodiment. The first side surface 38 faces the seal ring 32, and is abuttable with the seal ring 32. The back surface 37 in the axial direction is shorter in length than the back surface 37 in the first embodiment, because the back-up ring 33 is not accommodated in the groove 31.

Also in the second embodiment, the angle θ1 of the first side surface 38 is relatively small. Therefore, it is possible to prevent the seal ring 32 from protruding from the groove 31. The angle θ2 of the second side surface 39 is relatively large. Therefore, the dimensional quality can be improved.

The present invention is not limited to the first and second embodiments that have been described above with the drawings. For example, the following embodiments are also included in the technical scope of the present invention.

(1) At least one of the first side surface and the second side surface may be formed with a curved surface having a curved shape, instead of a straight surface. In this case, the angle θ1 and the angle θ2 are each formed between a tangent line of the curved surface and a plane in a direction orthogonal to the axis of the intermediate tube.

(2) The seal ring may have an angular ring shape in front view. In the case of the first embodiment, as long as the seal ring has an angular ring shape in front view, the back-up ring may preferably also have an angular ring shape in front view.

(3) The seal ring may have a lip around the outer circumference.

(4) The first side surface of the groove of the intermediate tube may be not inclined with respect to the plane, and the angle θ1 may be substantially zero.

REFERENCE SIGNS LIST 10 shock absorber
11 cylinder
12 piston
13 piston rod
14 intermediate tube
15 outer tube
18 discharge passage
19 reservoir
21 damping valve
25 suction passage
27 rectifying passage
31 groove
32 seal ring
33 back-up ring
38 first side surface
39 second side surface
P1 low-pressure side
P2 high-pressure side
PL1, PL2 plane

The invention claimed is:

1. A shock absorber comprising:
a cylinder;
a piston rod movably inserted into the cylinder;
a piston connected with the piston rod and partitioning an inside of the cylinder into a first chamber on which the piston rod is located and a second chamber on an opposite side thereof;
an outer tube covering an outer circumference of the cylinder;
a reservoir having an annular shape and formed between the cylinder and the outer tube;
a suction passage that allows only a flow of a liquid from the reservoir to the second chamber;
a rectifying passage that allows only the flow of the liquid from the second chamber to the first chamber;
a damping valve that imparts resistance to the flow of the liquid from the inside of the cylinder to the reservoir;
an intermediate tube disposed at an inner side of the reservoir and between the cylinder and the outer tube, and covering the outer circumference of the cylinder; and
a discharge passage formed among the intermediate tube, the cylinder, and the damping valve, and communicating with the inside of the cylinder,
wherein the intermediate tube includes, on an inner circumferential surface thereof, a groove having a concave shape in cross section to be capable of accommodating a seal ring that closes the discharge passage, and
wherein a relationship of θ1<θ2 is set to be satisfied, where θ1 represents an angle formed between one side surface, out of both side surfaces of the groove of the intermediate tube, that is located on an axial end side of the intermediate tube, and a plane orthogonal to an axial direction of the intermediate tube, and θ2 represents an angle formed between the other side surface that is located on an axial center side of the intermediate tube and the plane.

* * * * *